United States Patent

[11] 3,616,235

| [72] | Inventors | Dietmar Schoepfel<br>Berlin;<br>Johann Huber, Eichwalde, both of<br>Germany |
|---|---|---|
| [21] | Appl. No. | 729,514 |
| [22] | Filed | May 16, 1968 |
| [45] | Patented | Oct. 26, 1971 |
| [73] | Assignee | Forschungsinstitut fur die<br>Garungsindustrie, Enzymologie und<br>technische Mikrobiologie<br>Berlin, Germany |

[54] PROCESS FOR PRECIPITATING ENZYMES AND ENZYMATIC INACTIVE PROTEINS IN SOLUTION WITH SYNTHETIC TANNING MATERIALS
2 Claims, No Drawings

[52] U.S. Cl. .................................................. 195/68,
195/63, 195/66 R, 260/112 R
[51] Int. Cl. ........................................................ C07g 7/02

[50] Field of Search.............................................. 195/66, 68,
63; 260/112; 210/54

[56] References Cited
UNITED STATES PATENTS
3,212,996  10/1965  Simmons......................  195/62 X

*Primary Examiner*—Lionel M. Shapiro
*Attorney*—Richards & Geier

ABSTRACT: A process for making dry preparations of enzymes or proteins with low-salt content is characterized by precipitating albumen-containing culture solutions or culture filtrates with anionic, cationic or amphoteric-tanning materials and in that the following extraction of inorganic salts and tanning materials takes place with water or mixtures of water and organic solvents, particularly with mono- and/or polyvalent alcohols and ketones, glycol ethers, dioxanes and tetrahydrofurans mixable with water.

PROCESS FOR PRECIPITATING ENZYMES AND ENZYMATIC INACTIVE PROTEINS IN SOLUTION WITH SYNTHETIC TANNING MATERIALS

This invention relates to a process of making dry preparations of enzymes or proteins with low-salt content.

It is known in prior art that albumenous substances from aqueous media can be precipitated with tannin as water insoluble compounds. According to a known process inorganic salts are removed by water from water insoluble tannates and then enzymes are extracted by treating the tannates with mixtures of water and organic solvents. Another process describes the removal of amylglucosidase with the use of lignin and/or tannic acid from such enzymes which impede starch conversion.

An object of the present invention is to improve prior art processes.

Other objects will become apparent in the course of the following specification.

In the accomplishment of the objectives of the present invention it was found that proteins, particularly enzymes from aqueous media, for example, microbial culture solutions, can be effectively precipitated with synthetic-tanning materials.

In accordance with the present invention the synthetic-tanning materials which are used for the precipitation of albumenous substances, particularly enzymes, consist of condensation products of mono- and polyvalent phenols, phenol carbonic acids, phenol sulfonic acids, as well as phenol sulfonamides, lignin sulfonic acids and aromatic amines which contain carbon-, sulfon-, sulfoxy- or sulfonimid-bridges in the molecule.

The present invention also includes the group of synthetic-tanning materials which are produced by condensation of polyols (also sugars) with aliphatic oxy-and/or amino acids.

The subject of the invention is the use of anionic and cationic-synthetic-tanning materials for the precipitation of proteins, particularly enzymes from microbiel culture solutions or other vegetable or animal extract solutions.

While in prior art the precipitation of albumenous substances took place with tannin, lignin or natural tannic acids, the present invention uses synthetic tanning materials which produce the same precipitation results at greatly reduced costs.

According to the present invention albumen-containing solutions are reacted with synthetic tanning materials, whereby the tanning portion amounts preferably to 0.5 percent to 5 percent and more. The precipitation can take place in heat (up to 50° C.), at room temperature or while cooling. The albumen-tanning substance precipitated while stirring is then separated from excess by centrifuging, filtering or decanting and thereupon is treated either with water or with organic solvents. Water absorbs excess of tannic substances as well as inorganic salts, while by the use of organic solvents, other salts and the bound tannic substances are removed from the precipitant. As organic solvents were found to be suitable mono- and polyvalent alcohols, as well as ketones, glycol ethers, dioxane and tetrahydrofurans mixable with water. To avoid a drop in activity of enzyme-containing precipitations, the extraction of the synthetic tanning materials takes place at a cold temperature, preferably between 0° C. and plus 10° C. The precipitant thus produced can be again washed with organic solvents depending upon requirements of purity, or it can be immediately dried in the usual manner.

The following examples are given by way of exemplification only:

EXAMPLE 1

A culture filtrate of bacillus subtilis is used for the precipitation of amylase. 1.5 L. of an amylase-containing culture filtrate are set with a sodium carbonate solution to a pH of 7.0. Then while stirring, there is added a solution of a synthetic tanning material of the type of polycondensation products of nono-valent phenols with carbon bridges (such as those known under the trademark Skytan). The concentration of the tanning material in the mixture amounts to 2 percent. Deposits are removed and then there are two washings with acetone at 0° C. to plus 5° C. After drying a dry product of 3.70 gr. is produced. The total activity in culture filtrate amounts to 2 140 500 amylase units (1E according to IUB), while the total activity of the dry product is 1 765 000 amylase units. Thus there is an activity output of 82.5 percent.

EXAMPLE 2

A culture filtrate of bacillus subtilis is used for precipitation of protease. To 1,000 ml. filtrate with a total activity of 4,780 protease units ($PU_{cns}$) is added at a ph of 7.0 a solution of a synthetic tanning material the pH of which is also set 7.0. The tanning material is of the type of polycondensation products of polyvalent phenols and aromatic sulfonic acids (such as "-Skytan"). After stirring for 2 hours at 30° C., the deposit is separated, it is extracted twice with acetone and then dried. The result is 2.20 gr. dry product with a total activity of 3,771 protease units. The activity output thus amounts to 78.9 percent.

It is apparent that these examples have been given solely by way of illustration and that they are subject to many variations and modifications within the scope of the present invention.

What is claimed is:

1. The process for making dry enzyme with low-salt content, which comprises precipitating enzyme-containing culture solutions or filtrates of microorganisms or extracts of tissues of plants or animals with synthetic-tanning materials selected from the group consisting of condensation products of mono- and polyvalent phenols, phenol carbonic acides, phenol sulfonic acids, phenol sulfonamides, lignin sulfonic acids and aromatic amines which contain carbon-, sulfon-, sulfoxy- or sulfonimid-bridges in the molecule, extracting inorganic salts and tanning materials from the enzyme precipitated with said tanning materials with water or a mixture of water and organic solvents and then drying the enzyme.

2. The process in accordance with claim 1, wherein the organic solvents are selected from at least a monovalent alcohol and ketones, glycol ethers, dioxanes and tetrahydrofurans mixable with water.

* * * * *